Figure 1:
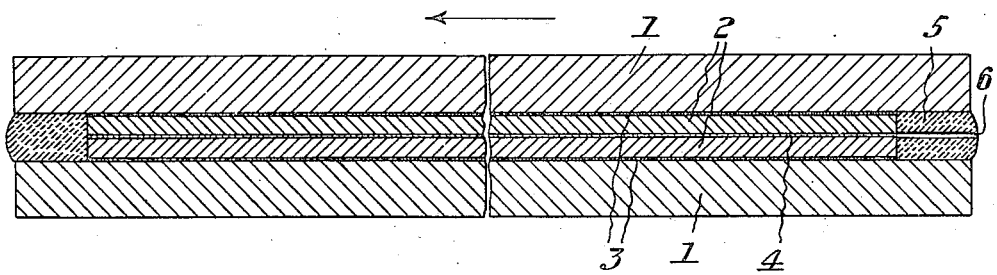

May 23, 1939.   J. B. ORR, JR   2,159,043

METHOD OF HANDLING AND WORKING METAL MEMBERS

Filed Dec. 24, 1936

INVENTOR
John B. Orr, Jr.
By Thomas G. Miller
His attorney

Patented May 23, 1939

2,159,043

UNITED STATES PATENT OFFICE 2,159,043

METHOD OF HANDLING AND WORKING METAL MEMBERS

John B. Orr, Jr., Edgeworth, Pa.

Application December 24, 1936, Serial No. 117,509

24 Claims. (Cl. 29—189)

This invention pertains to the making, handling, and/or working of metal members, and more particularly, to pressure control expedients to be employed during the conditioning, working, and/or handling of such members.

Under certain conditions, difficulties arise in working and/or rolling materials in packs, or, in general, in handling metal materials that are to be worked as a group, and thus, that have portions sealed off or closed off from the atmosphere in order to prevent the entry of scale-forming gases, dirt, grit, etc. These difficulties not only tend to spoil the work and increase the number of rejections, but, of even greater importance, they offer hazards to the workmen handling the metal.

The present invention in one aspect relates particularly to properly controlling and/or balancing the fluids (such as gases) that exist in or are created (evolved) in an enclosed or sealed pack or combination of metal members. In another aspect, it deals with the proper proportioning of volume-pressure relations between gases in the pack and those outside the pack.

In my co-pending applications, Serial No. 82,160, entitled "Making composite metals," and Serial No. 106,256, entitled "Manufacture of composite metal members," I have set forth new and improved procedures for manufacturing composite metal members, such as plates, strips, bars, and/or sheets, which may be two-ply, three-ply, etc. In accordance with these procedures, I preferably enclose a layer of carbon such as lamp black or oil in an edge-sealed pack of metal members, comprising carbon steel members and stainless or special steel members. The carbonaceous material not only aids in welding two relatively unlike metal layers or members together, but also combines with oxygen present in the pack, and further, combines with oxygen that tends to enter the pack during heating, rolling, or hot working operations. The type of carbon provided is so active at the hot working temperatures that it also robs any scale present in the pack of its oxygen (reduces it), and thus, further aids the welding action. Since the carbon becomes active when the pack is being heated to a hot working temperature, the carbon monoxide formed tends to fill spacing within the pack formerly taken up by the oxygen.

Regardless of the type of fluid within the closed or sealed pack, whether it comprises oxygen, carbon monoxide, inert gases, or in general, atmospheric gases, it will expand and contract as the temperature changes, and if the pressure becomes too great, will swell the pack. This may occur when a pack of moderate dimensions is being heated prior to a rolling or hot working thereof.

I have definitely determined that when a package of moderate dimensions, say, ½ to 2" in thickness, is assembled and heated, that the gases in the pack, including those that may be formed therein by the combustion of carbonaceous material, attain so great a pressure in their confined space that the faces of the package become blown out or distended so that the whole takes on the resemblance of a pillow. Of course, in such a case, considerable difficulty will be encountered in trying to move the package into the pass of the rolls. Further, when the package actually moves between the rolls, it is immediately flattened out, causing the gases to burst the package apart with considerable force. Thus, an explosion and an immediate combustion of the escaping carbon monoxide gas may occur. This is very hazardous to the men working in a mill and may also spoil the work.

I have also determined that when certain desired inert gases are placed in a pack prior to sealing it, that the pack must be very carefully heated and/or cooled if swelling and/or bursting is to be prevented. Other gases which are deliberately sealed within a pack, or which later enter or are formed therein, will also expand when the pack is heated in a suitable furnace preliminary to hot working.

In some cases it is necessary to process the metal members of a pack in another rolling operation, and during certain pickling and cleaning operations which take place between the rolling operations, gases are formed within the once-rolled assembly, and these gases when heated also tend to expand and burst the pack. Then, too, some of them when suddenly cooled, act in a similar manner, and the majority of them will burst the pack when the members of the pack are compressed in the pass of a rolling mill. In other words, the gases will change their volume-pressure relationship during certain steps involved in the processing of metal members.

In view of the above explanation, it is seen that the working or rolling of certain shapes and the presence of certain gases or fluids within a pack, may give rise to hazardous and detrimental conditions, and it has been an object of my invention to eliminate these hazards and detriments.

Another object has been to provide improved procedure for handling and/or working metal members such as plates, bars, sheets, and/or strips.

Another object of my invention has been to develop expedients which will make possible the utilization of any suitable gaseous agency within a pack, casting, or group of enclosed metal members without the difficulties which arise by reason of its contraction and expansion characteristics.

A further object of my invention has been to provide a practical and effective manner of controlling or handling fluid pressure developed within an enclosed or sealed group of metal members.

A still further object has been to analyze the factors and problems that arise due to the presence of a fluid within a group of enclosed metal members and to determine how such factors may be controlled to eliminate the difficulties and to provide desired results.

These and many other objects of my invention will appear to those skilled in the art from the description taken in view of the drawing and the appended claims.

In the drawing—

Figure 2:
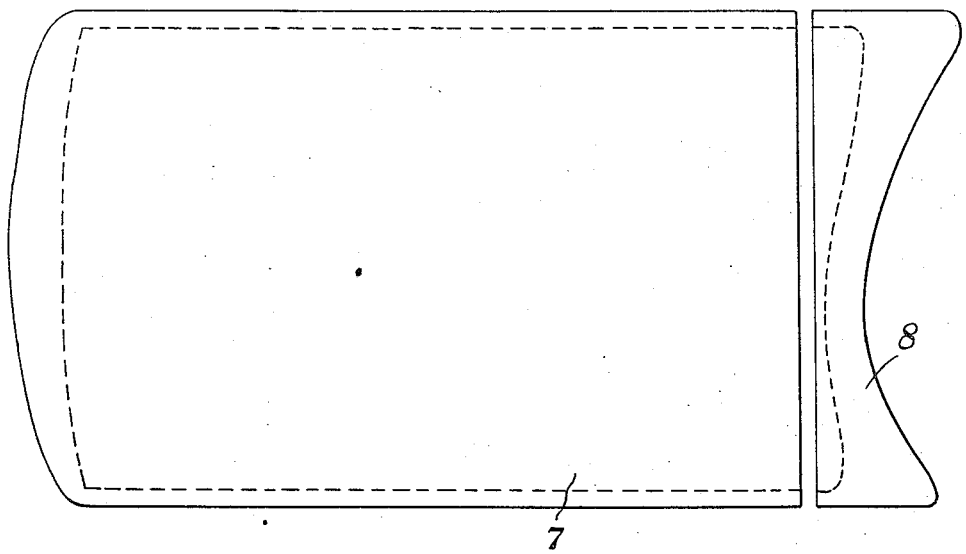

Figure 1 is a cross sectional view taken through a pile or package employing the principles of my invention; and Figure 2 is a top plan view of a package 7 in the breakdown stage after the first rolling operation, with its tail end 8 sheared off.

In determining a solution of the problems above presented, I recognized that in many cases and, particularly, in the case of the procedures set forth in my co-pending applications above-mentioned, it is advantageous to maintain a certain pressure and/or volume within a pack or sealed group of metal members during heating and cooling, as well as during working operations. That is, in my co-pending application Serial No. 82,160, I provide sufficient carbon in the pack to not only absorb or take up the oxygen that exists as a free gas in the pack, but also to take up or combine with oxygen which is entrained as a scale or metal oxide. The amount of carbon provided is preferably sufficient to take care of and absorb any further oxygen which may work in through the pores of the weld or the metal members during the processing operations.

I have found that the gas formed by the carbon and oxygen, namely carbon monoxide, should have a pressure sufficient to offset the pressure of the atmospheric fluids or gases which would otherwise tend to permeate the package. For these reasons, it will be seen that the solution of the problems here presented, is further complicated by the above-desired features, which are to be retained.

I then determined that a small hole drilled in the edge or side of the pack would be a solution as far as the first heating and hot working operations are concerned, provided such hole (or spaced-apart holes) is of a size sufficiently large to permit excessive or deforming gases to escape during the heating of the pack and prior to its insertion in the pass of a rolling mill. However, the hole must be small enough in size that it will prevent the free entry of atmospheric gases into the pack. In other words, the opening or hole should be of such a size that excessive pressure built up within the pack, will be lowered by the exhaustion of a quantity of the gases, but such that sufficient pressure will be maintained in the pack to offset the pressure of the atmosphere, and thus, to offset the tendency of atmospheric gases to enter. These atmospheric gases, of course, include oxygen which forms scale. The scale hinders proper welding of the metals together, and spoils the faces of the members being worked.

By way of illustration, I have shown a pack of metal members in Figure 1, which comprise a pair of stainless or non-corrosive or special steel members 2, interposed between a pair of carbon steel members 1. Suitable weld-preventing material 4 may be imposed between the special steel members 2 and suitable weld-enhancing material such as carbon black 3, may be provided between the adjacent or abutting surfaces of each carbon steel member 1, and its associated stainless steel member 2.

In accordance with my invention, the pack is sealed in some suitable manner such as by a continuous edge weld 5 and one or more, preferably one, hole is drilled in or provided in the weld, and is represented by the numeral 6. The invention applies equally well to members enclosed in or sealed by a casting. After the pack has been suitably heated, it is entered in the pass of a rolling mill, preferably in such a manner that the end which has the hole 6 is the last to enter the pass (trails).

During subsequent cooling, heating, and/or working, it may be undesirable to have the hole 6 in the pack. This is particularly true when the pack is being cooled, since it tends to contract and to suck in atmospheric gases, which when the pack is again heated, tend to form scale. However, another feature of my invention is that the holes 6 are preferably inserted or provided at such points in the pack that they will be automatically closed and/or sealed by the pressing and/or reducing action of the first pass or first rolling or working operation. Although the first exhaustion of high pressure gases from the pack may be sufficient, even if the pack is to be subjected to a number of successive heating and rolling and possibly cooling operations, I contemplate drilling or forming holes in the pack at certain periods in the handling of the pack as are necessary to take care of excessive pressures.

I contemplate locating the hole in such a manner that it may be closed with the first working operation or with any desired number of subsequent operations. I also contemplate, when desirable, reopening the hole and/or drilling a new hole when the pack is to be reheated for further working.

As has been intimated above, I find that there is a certain definite size of hole in the pack which makes possible the utilization of the desired factors without incorporating the disadvantageous features which would otherwise follow. I have been able to determine the desired size of hole which is advantageous from devised formulas which express the amount of gas or fluid that will flow through a certain size of hole in a specified time.

As previously pointed out, the gaseous pressure within the package should be maintained above the atmospheric pressure which exists within the heating furnace, in order that the oxygen in the atmosphere will be prevented from entering the package in sufficient quantities to reduce all of the heat-sensitive, non-scaling-forming gas-producing agency therein, and thus, to form scale on the surfaces that are to be welded. The other factor is that the gaseous pressure inside the pack must not become too great, or it will distend the package and cause trouble, particularly when it is pressed between the rolls.

Since the gaseous pressure inside the package is produced by the expansion of the air or other gaseous fluid therein during the heating of the pack, as well as by the gases which are produced by the separator material and the chemical combination of the free carbon and the oxygen, it will be apparent that the problem is a complex one.

If a good separator material, such as mentioned in my co-pending application Serial No. 82,160, is employed, and the plates are reasonably free from scale when the package is assembled, most of the gaseous material in the package will be expanded air (assuming that the package has not been previously exhausted). The volume of gas which must then be allowed to escape from the assembly per unit of time will depend upon the amount of air present therein and the rate of heating, if the gaseous pressure therein is to be maintained within the desired limits.

The size of hole for maintaining the desired pressure in a package is determined from the following formulas:

$$(1) \qquad d = \sqrt{\frac{CPb\sqrt{TG}}{218.4 TbCv}}$$

in which:

$d$ is the diameter of the hole in inches.
$Pb$ is the base pressure of a standard cubic foot of the gas in pounds per square inch absolute.
$T$ is the average temperature of the gas in degrees F. absolute during the heating.
$G$ is the specific gravity of the gas which is composed for the most part of air and carbon monoxide and will be approximately 1.0.
$Tb$ is the base temperature of assumed standard cubic feet of gas in degrees F. absolute.
$Cv$ is the coefficient of velocity, the ratio of the actual velocity to the theoretical velocity of the gas. This has been found by experiment to equal approximately 0.56 with the diameter of hole with which we are concerned.
$C$ is the hourly orifice coefficient.

$$(2) \qquad C = \frac{Q}{\sqrt{hP}}$$

in which:

$Q$ is the standard cubic feet of gas passing through the hole per hour.
$h$ is the difference in pressure between the gas inside the package and the furnace atmosphere as measured by the height in inches of the column of water which will be supported by it.
$P$ is the pressure within the package in pounds per square inch absolute.

Since the quantity of gas which must pass through the hole per unit of time to provide a constant or nearly constant pressure within the package is dependent on the volume of air space within the package and the rate at which the temperature is raised, the following formula will express the relationship:

$$(3) \qquad Q = \frac{520 V(T'T)}{TT'} \times \frac{60}{t}$$

in which:

$Q$ is the quantity of gas in cubic feet at standard conditions evolved per hour.
$V$ is the volume of air space within the package in cubic feet.
$T$ is the temperature in degrees F. absolute of the package at the beginning of the time interval.
$T'$ is the temperature in degrees F. absolute of the package at the end of the time interval.
$t$ is the time interval in minutes.

Applying the above formulas to the case of a package of about 14"x1"x38" having an air space of 0.02 cu. ft., I find that a hole 0.009" in diameter will maintain a pressure within the package in excess of 4" of water. I have also determined that a hole 0.0045" in diameter will maintain a pressure within the package of at least 56" of water above furnace atmosphere (two pounds per sq. in.), when the package is brought from room temperature to 2000° F. in fifteen minutes. Since it is difficult to drill a hole ten-thousandths of an inch in diameter through a half-inch of steel, I have drilled a one-eighth inch hole and then placed a wire of the same size as the desired hole within the larger hole and center punched or swaged the metal on each side of the hole sufficiently to close it about the wire. The wire is then withdrawn, leaving the opening of the desired size.

I have also realized and taken into consideration the gaseous expansion which takes place in the package when the oxygen-absorbing agency, such as carbon, is oxidized by the oxygen, creating a gas such as carbon monoxide which, of course, has twice the volume of oxygen. By actual computation, I have found that the gaseous pressure increase produced by the employment of carbon as the agency need not be taken into consideration when determining the proper size of hole. That is, the pressure at the time of the reaction cannot exceed twice that existing in the package prior to such reaction, and the pressure existing in the package prior to such reaction under normal conditions will not be more than a few ounces above atmospheric. Thus, the maximum pressure which may be built up will be less than 28 pounds absolute.

The following integral formula expresses the time required before the pressure will be reduced to normal as the heating cycle continues:

$$(4) \qquad T = \frac{60V}{CPa} \int \frac{dP}{28P^2 - 403.2P}$$

in which:

$T$ is the time in minutes.
$V$ is the volume of gas within the package at the time when the conditions of maximum pressure exist.
$C$ is the coefficient of the hole in cubic feet per hour.
$Pa$ is the maximum pressure within the package.
$P$ is the normal pressure existing within the package due to the expansion of the gases as a result of the ever increasing temperature as expressed by the formulas above cited, in other words, the normal pressure condition.

Solving the above Formula 4 it will be seen that the time period required before the conditions will again reach normal is far less than the period of heating remaining after the chemical reaction takes place. Thus, the gaseous pressure at the end of the heating period will be only such as expressed in the Formulas 1 to 3, inclusive. However, if some other suitable agency is employed in the pack for the purposes enumerated, those skilled in the art can readily determine from Formula 4 whether or not the increased volume and/or pressure of gases produced by the chemical combination of elements is sufficient to require a larger hole than would normally be determined by the utilization of Formulas 1 to 3, inclusive. However, since carbon is the preferable agency and since other types of inert gases which I have employed fall within the same classification as the carbon agency as far as pressure and/or volume in the pack are concerned, it is believed that in general it will be unnecessary to employ Formula 4.

If in any case, the pressure increase produced by a weld-inhibiting or a weld-enhancing material in the pack is found by Formula 4 to be sufficient to require a larger hole, the additional diameter required can be determined from Formulas 1 to 3, inclusive.

I have determined that the pressure within the pack should preferably be at least 0.001" of water above and preferably not greater than 560" of water above the furnace atmosphere. That is, I have found that if the pressure is allowed to go below the above-mentioned amount, sufficient oxygen may enter the pack and consume all of the excess carbon existing therein, resulting in the formation of scale.

The entry of oxygen is brought about by fluctuations in the pressure of the furnace atmosphere whereby such pressure becomes greater than the average pressure of the furnace atmosphere and also greater than the pressure within the package. I also find that when the pressure exceeds the above-mentioned amount, deformation of the package may result.

Referring to the example previously given, of a package 14" x 1" x 38" containing an air space of 0.02 cu. ft., heated from room temperature to 2000° F. in fifteen minutes, the above maximum and minimum pressures would be maintained by a hole of a diameter from 0.004" to 0.045".

I prefer a range of between 0.2" of water and 400" of water as providing the most advantageous results. This range wil require a hole in the specific example above given between 0.009" and 0.015" in diameter.

It is difficult to determine the exact pressure which will exist within the package at a particular time during the heating cycle because of the conditions which exist within the furnace, such as the pressure of the furnace atmosphere, the rate of the heat absorption by the metal of the package, and certain conditions within the package such as the time during which the oxidation of the carbon will take place and the rate of such oxidation under normal operating conditions. However, I have definitely determined that the pressure will not exceed a certain amount, that the maximum pressure will not be detrimental, and that the pressure will not be less than a certain desired amount. And, it will be apparent that the latter factors are those of definite importance in obtaining the desired results.

I have determined that a hole whose diameter is calculated in accordance with the formulas set forth herein will be of a size large enough to permit the escape of enough gas during the fabricating operations to prevent the building up of excessive pressure within the assembly which might cause deformation of the package, and that will be of a size small enough to prevent the escape of all the gases within the assembly, and/or a sufficient influx of outside gases or oxygen that would form scale therein.

When the package is placed in the reducing rolls, some of the remaining gases will be forced out of the hole by the reducing or pressing action of the rolls before the hole is closed, since the end having the hole is preferably the last to move through the roll pass.

It is often necessary to process the metal in another rolling operation and, as previously pointed out, certain gases will form within the once-rolled assembly. In this case, I have found it desirable to shear the end off the package which will be the last end to enter the rolls. I have also sheared the package into two halves through the middle and then passed both halves through a rolling mill in the second rolling operation in such a manner that the sheared edge of each half will be the last to enter the rolls. This permits any gases within the assembly to freely escape during the heating and rolling without hazardous explosions and without deforming the package or the members of which it is composed.

It might be supposed that after the first rolling operation, in the case where one or more members are to be plied or welded together, that the four edges of the package could be sheared, allowing the clad or plied plates or members to be separately handled. However, I have found that it is very advantageous to maintain three edges in an attached relationship, since the second rolling operation may have for its purpose the better and further welding or alloying of two or more layers or plies together; separate treatment tends to tear them apart. Further, if the members are separated, dirt, scale, and grit will tend to fall from the roll stand down upon their stainless sides, and when they are passed through the rolls, will produce pits by reason of the pressing action.

Then, too, the stainless or special steel members of the composite members have different coefficients of expansion and contraction, and different elongations under rolling pressures than the carbon steel members. They thus tend to buckle and warp when not held in position while being heated and cooled. These members must thus be first straightened out or flattened out before they can enter between the rolls. After the rolling operation, they must be kept straight and flat when they cool, if the plates are to be continuously moved through a number of roll passes. However, the binding off of substantially three sides of a group of plates, and thus, maintaining the plates in a pack-like group which is substantially open at one end, prevents any warping and buckling of the members, and protects the surfaces of the members from grit and dirt, as well as from the direct action of oxygen which is present in the atmosphere. Since I preferably move the edge-sealed pack through a roll pass with the sheared portion trailing, the rolling operation itself tends to force out any gases within the pack and to prevent the entry of atmospheric gases.

It will appear to those skilled in the art that I have been the first to provide openings in a pack of enclosed or sealed metal members which are proportioned and selected upon a definite basis in order to obtain desired conditions. The openings can be provided in any suitable manner, provided of course, that they have the desired size or characteristics.

I have also been able to maintain a desired pressure, as well as a desired fluid or fluids within the pack while simultaneously exhausting a certain quantity or volume of fluid or fluids until a desired working pressure has been reached. In other words, in effect, I provide openings in a pack of such a size that a desired equalization or proportioning of pressure exists as between the pressure of the atmosphere and the pressure of the gases or fluids within the pack during various stages of handling and/or working of the pack.

I have also been able to obtain the advantages of a sealed pack without the disadvantages thereof, while simultaneously obtaining the advantages of an open pack without the disadvantages thereof.

Although I find, as previously stated, that it is preferable to employ one opening or hole and to locate it at the back or tail end of a pack, any suitable number of holes may be employed and their diameters can be selected by using Formulas 1 to 3, inclusive, to determine the desired size of a single hole. Then, the desired number of holes is given a combined hole area substantially equal to the hole area for the diameter calculated for a single hole. Any suitable location may also be employed. For example, a hole in the tail end of a pack permits excess gases to exhaust, during the rolling operation and before the hole is closed by such an operation, while holes at opposite sides of a pack may be suitable after a pickling operation or before an annealing operation, and a hole at the front of the pack may be suitable when it is desirable to completely or at least partially close it at the beginning of the rolling or working operation.

As applied particularly to the use of a weld-enhancing material such as amorphous carbon, the present invention enables an operator to use a minimum of such material and to thus minimize any carbonization of the members in a pack.

My invention may be employed in connection with metal processing to control the volume-pressure relations of any suitable fluids or gases, and although in application it has particular value in the processing of composite metal members, it may also be employed in the processing of single-ply members.

It will also appear that the principles of my invention may be applied in connection with the handling and/or working of any suitable pack of metal members where pressure conditions are to be normalized, although the present invention is of special value as applied to small packs made up in accordance with the principles of my co-pending applications above-mentioned.

I have found that a small hole provided by the procedure previously explained, namely, by swaging the metal of a larger hole about a form, gives a very advantageous result. Further, it has a safety feature, since the swaged metal will give way before the weld or the walls of the pack in case of an excessively high pressure. However, the hole can be provided in any suitable manner; for example, if the outer metal coating is cast about the members, the hole may be provided by employing a form that can be removed after the casting has set.

In speaking of "self-contained" in the claims, I have particular reference to a group of metal members having portions that hold them in a unitary assembled relationship.

Although I have illustrated certain applications and preferred embodiments of my invention, it will be apparent to those skilled in the art that other suitable applications and many modifications, additions, substitutions, and/or combinations thereof may be made without departing from the spirit and scope of the invention.

I claim:

1. In a method of fabricating metal members, the steps of forming a group of metal members, closing off the pack and venting it, providing a non-oxidizing fluid in the closed off group, the size of the vent being such that a desired volume-pressure relationship will exist between fluid in the group and fluid in the atmosphere during subsequent operations, subjecting the group to a hot working operation, and closing the group just before such working operation is completed.

2. In a method of fabricating metal members, the steps of forming a group of metal members, closing off the pack and venting it, providing a non-oxidizing fluid in the closed off group, the size of the vent being such that a desired volume-pressure relationship will exist between fluid in the group and fluid in the atmosphere during subsequent operations, heating the group to a hot working temperature, hot working the group and closing the vent, again venting the pack, and hot working it.

3. In a method of fabricating composite metal members, the steps of forming a pack of metal members, placing them in an adjacent substantially face-to-face relationship, placing a heat-sensitive carbonaceous material in the pack, partially closing off the pack from the atmosphere, the closing off being proportioned in such a manner that a desired volume-pressure relationship will be maintained between gases existing and evolved in the pack and gases of the atmosphere during subsequent heating and processing of the pack.

4. In a procedure for forming composite metal members, the steps of providing a carbon steel member and a special steel member, placing such members in a substantially coaxial alinement with respect to each other, closing off such members, providing an excess of a heat-sensitive oxygen-absorbing gas-forming agency within closed off portions of such members, providing a small opening in such closed off portions, and hot working such members.

5. In a procedure for forming composite metal members, the steps of providing a pair of carbon steel members and a pair of stainless steel members, placing the faces of such members in a substantially coaxial alinement with respect to each other, placing a weld-enhancing carbonaceous material between the surfaces of adjacent carbon and stainless steel members, placing a weld-inhibiting material between adjacent members of the same pair, closing off the surfaces of such members from the atmosphere, providing a small opening to the closed off surfaces adjacent one end of such members, heating such members as a pack to a hot working temperature, hot working the pack, and before the pack has cooled, sealing off the opening therein.

6. In a method of handling a substantially sealed group of metal members, the steps of providing a gas-producing agency in the sealed group, providing a vent opening in the group of a size large enough to permit a normalization of pressure of gas produced therein when the group is heated prior to a hot working operation, and of a size small enough to prevent the entry of objectionable gases from the atmosphere.

7. In a method of handling a substantially sealed group of metal members, the steps of providing a gas-producing agency in the sealed group, providing a vent opening in the seal of a size large enough to permit a normalization of pressure of gas produced therein when the group is heated prior to a hot working operation, and of a size small enough to prevent the entry of objectionable gases from the atmosphere, hot working the pack, and sealing the opening.

8. In a method of handling a substantially closed off pack of metal members, the steps of providing a vent opening in the pack of a size large enough to permit a normalization of pressure therein when the pack is heated prior to a hot working operation, and of a size small enough to prevent the entry of objectionable gases from the atmosphere, hot working the pack, and after a major portion of the pack has been worked, sealing the opening.

9. In a method of handling a closed pack of metal members, the steps of providing an oxygen-absorbing non-oxidizing agency in the pack, hot working the pack in a suitable number of passes, cutting off a closing off end of the pack and reheating the pack, and then entering the pack in a suitable number of roll passes with its open and cut off end trailing.

10. In a method of handling a closed pack of metal members, the steps of providing a heat-sensitive non-oxidizing gas-forming agency in the pack, providing an opening in the pack of a size such that a desired volume-pressure relationship will exist therein when the pack is heated and worked, hot working the pack, shearing off an end of the pack, and then hot working the sheared-off pack.

11. In a method of handling a group of composite metal members, the steps of providing a substantially closed off group of metal members, providing a processing-sensitive non-oxidizing gas-forming agency in the closed off group, processing the group until at least two of the members of the group adhere to each other, cutting off a portion of a group, and then processing the cut-off group.

12. In a method of handling a group of composite metal members, the steps of providing a closed off group of carbon steel and stainless steel members which are to be welded together to form composite members, providing a processing-sensitive non-oxidizing gas-forming agency in the closed off group, working the group until the stainless steel and carbon steel members are welded together, opening a portion of the group to the atmosphere, and again working the group.

13. In an article of manufacture, a pack of metal members having a pair of special steel pieces and a pair of carbon steel pieces placed with their faces in a substantially alined juxtaposition, a processing-sensitive non-oxidizing gas-forming agency in the closed off pack, a continuous band closing off the pack between said pieces, said band having a small opening venting the pack to the atmosphere.

14. In an article of manufacture, a pack of metal members having a pair of special steel pieces and a pair of carbon steel pieces placed with their faces in a substantially alined position, metal substantially closing off the pack, a heat-sensitive carbonaceous material in the pack, and an opening in said pack, said opening having a size such that a desired volume-pressure relationship will be maintained in the pack when it is heated and worked.

15. In a method of fabricating metal members, the steps of closing off at least a portion of a member, providing an agency within the closed off portion for absorbing oxygen and evolving a gas, the closing off being proportioned in such a manner that a desired volume-pressure relationship will be maintained between gas evolved adjacent the closed off portion and fluid of the atmosphere during subsequent processing, and suitably processing the member.

16. In a method of fabricating metal members, the steps of closing off at least a portion of a metal member, providing an oxygen-absorbing agency within the closed off portion adapted to form a non-oxidizing gas when activated, the closing off being proportioned in such a manner that a desired volume-pressure relationship will be maintained between gas present and formed adjacent the closed off portion and fluid of the atmosphere, activating such agency and suitably processing the member.

17. In a procedure for forming composite metal members, the steps of providing a pair of members, closing off such members, providing an excess of a heat-sensitive oxygen-absorbing gas-forming agency within closed off portions of such members, providing a small opening in such closed off portions, and working such members.

18. In a procedure for forming composite metal members, the steps of providing a group of members, at least partially closing off such members, providing a heat-sensitive oxygen-absorbing gas-forming agency within closed off portions of such group, the closing off being proportioned in such a manner that a desired volume-pressure relationship will be maintained between fluid in the group and fluid of the atmosphere during subsequent processing, and suitably hot processing such group.

19. In a method of fabricating metal members, the steps of forming a closed off group of metal members, providing an oxygen-absorbing non-oxidizing gas-producing agency in the closed off group, providing the closed off group with an opening, the opening being of a size substantially corresponding to a size determined by Formulas 1, 2, and 3 of the specification, so that the desired volume-pressure relationship will exist between fluid in and produced in the pack and fluid of the atmosphere during subsequent operations.

20. In a method of fabricating metal members, the steps of forming a self-contained group of metal members whose inner portions are closed off from the atmosphere, providing a non-oxidizing fluid in the closed off group, determining a suitable size of opening in the closed off group for maintaining a desired volume-pressure relationship between the non-oxidizing fluid in the group and fluid of the atmosphere during subsequent processing, providing an opening in the closed off group while retaining the group in a self-contained closed-off relationship of the predetermined size, and then suitably processing the group.

21. In a method of fabricating metal members, the steps of forming a group of metal members, closing off the group from the atmosphere, providing a non-oxidizing fluid agency in the closed off group, determining and providing a suitable size of opening in the closed off group for maintaining a desired volume-pressure relationship between the non-oxidizing fluid in the group and fluid of the atmosphere during subsequent processing, heating the group to a hot working temperature, and then hot working the group.

22. In a method of fabricating metal members, the steps of providing a self-contained group of metal members whose inner portions are closed off, providing a suitable non-oxidizing fluid agency within the enclosure, providing the enclosure with an opening of a size within a reasonable range of size calculations made by Formulas 1, 2, and 3 of the specification, so that a desired volume-pressure relationship will exist between non-oxidizing fluid in the pack and fluid of the atmosphere during subsequent operations, and processing the group while retaining the group in a self-contained closed-off relationship.

23. In a method of fabricating metal members, the steps of forming a self-contained group of metal members whose inner portions are closed off, providing a suitable non-oxidizing fluid agency within the closed off group, providing an opening in the closed off group of a size within a reasonable range of size calculations made by Formula 4 and Formulas 1, 2, and 3 of the specification, so that a desired volume-pressure relationship will exist between non-oxidizing fluid in the pack and fluid of the atmosphere during subsequent operations upon the self-contained closed-off group.

24. In an article of manufacture, a metal member having means associated therewith in a self-contained relationship with respect thereto at least partially closing off said metal member, said means having an opening of a size within the calculation determinations of Formulas 1, 2, and 3 of the specification, so that a desired volume-pressure relationship will exist between closed-off portions of said member and the surrounding atmosphere.

JOHN B. ORR, Jr.